(12) United States Patent
Jackson et al.

(10) Patent No.: US 7,611,998 B2
(45) Date of Patent: Nov. 3, 2009

(54) ENHANCED ELASTOMER COATED, PROTECTIVE BARRIER FABRIC AND PROCESS FOR PRODUCING SAME

(75) Inventors: Scott Richard Jackson, Rock Hill, SC (US); Pierre Defaux, Charlotte, NC (US)

(73) Assignee: Bluestar Silicones France SAS, Lyons (FR)

( * ) Notice: Subject to any disclaimer, the term of this patent is extended or adjusted under 35 U.S.C. 154(b) by 0 days.

(21) Appl. No.: 11/153,157

(22) Filed: Jun. 15, 2005

(65) Prior Publication Data

US 2005/0282453 A1 Dec. 22, 2005

Related U.S. Application Data

(60) Provisional application No. 60/580,149, filed on Jun. 16, 2004.

(51) Int. Cl.
*B32B 27/04* (2006.01)
*B32B 15/14* (2006.01)
*B32B 5/26* (2006.01)
*B05D 5/00* (2006.01)
*B05D 7/00* (2006.01)

(52) U.S. Cl. .................... 442/249; 427/412; 427/427.4; 427/427.6; 442/238; 442/239; 442/64; 442/79; 442/81

(58) Field of Classification Search .................. 442/249, 442/238, 239, 64, 79, 81, 85, 87, 164, 165
See application file for complete search history.

(56) References Cited

U.S. PATENT DOCUMENTS

| | | | |
|---|---|---|---|
| 3,594,213 A | 7/1971 | Rudman | 117/65.2 |
| 4,379,192 A | 4/1983 | Wahlquist et al. | 428/156 |
| 4,588,614 A | 5/1986 | Lauchenauer | 427/243 |
| 5,183,702 A | 2/1993 | Taylor et al. | 428/266 |
| 5,236,532 A | 8/1993 | Taylor et al. | 156/242 |
| 5,296,298 A | 3/1994 | Fujimoto et al. | 428/447 |
| 6,071,602 A | 6/2000 | Caldwell | 428/224 |
| 6,238,767 B1 | 5/2001 | McCormack et al. | 428/99 |
| 6,342,280 B1 | 1/2002 | Patrick et al. | 428/34.6 |
| 6,416,613 B1 | 7/2002 | Patrick et al. | 156/281 |
| 6,562,737 B1 | 5/2003 | Bohin et al. | 442/59 |
| 6,586,551 B2 | 7/2003 | Bohin et al. | 528/15 |

FOREIGN PATENT DOCUMENTS

| | | | |
|---|---|---|---|
| EP | 0 553 840 B1 | 3/1996 | |
| EP | 0 681 041 B1 | 7/2000 | |

*Primary Examiner*—Lynda Salvatore
(74) *Attorney, Agent, or Firm*—Buchanan, Ingersoll & Rooney

(57) ABSTRACT

Coated barrier fabrics are prepared with a two part, cold cure polyoxysiloxane composition and a unique two pass, two cure rate, coating process. Preferably, the coated fabrics have overlayed a second uncoated fabric on the inner surface of the coated substrate. This preferred process realizes a reusable medical barrier fabric with exceptional durability even after undergoing many laundering/autoclaving/drying cycles.

23 Claims, No Drawings

ENHANCED ELASTOMER COATED, PROTECTIVE BARRIER FABRIC AND PROCESS FOR PRODUCING SAME

CROSS-REFERENCE TO RELATED APPLICATION

This application claims priority from U.S. Provisional Application Ser. No. 60/580,149 filed Jun. 16, 2004.

FIELD OF THE INVENTION

The present invention relates to improvements in barrier fabrics. More particularly the present invention relates to improvements in barrier fabrics especially for use in reusable or non-disposable medical products and to the methods of making same. These products not only exhibit significantly enhanced viral and liquid barrier properties, but also possess much improved laundering and autoclave resistance.

BACKGROUND OF THE INVENTION

Barrier fabrics are generically characterized as being impervious to penetration by liquids. Barrier fabrics with much more stringent technical requirements, are also especially suited for use in the medical field to prevent or control the spread of infectious microorganisms, such as viruses and bacteria, blood, and other fluid transmissions associated with, for example, surgical procedures.

Barrier fabric properties are critical for medical products such as surgical drapes that are used to maintain sterile surgical and/or procedure fields and protective apparel such as surgical gowns. These barrier fabrics are widely used in hospitals, doctor's offices, clinics, and the like by health professionals such as doctors, medical assistants, nurses, and nurses' aides. Particularly where there is a possibility of coming into contact with contaminated body fluids, every effort is made to protect the health professional and the patient. Health professionals routinely use medical barrier fabrics during surgery, the drawing of blood, or while working with specimens containing contaminated fluids to both protect themselves and to avoid cross or secondary contamination of subsequent patients through the inadvertent transmission of infectious materials.

There are currently two types of medical barrier fabrics: single use, i.e., disposable materials and reusable materials. Disposable fabrics are typically constructed from non-wovens made from light-weight synthetic fibers or synthetic fibers blended with natural fibers. Performance of the disposable non-woven fabrics in terms of liquid repellency is generally acceptable; however, these fabrics often fail to provide the spectrum of properties deemed necessary to achieve desirable protection in many medical applications.

Reusable medical barrier fabrics, on the other hand, are usually woven and constructed from cotton, cotton/polyester blends, or polyester and have a high thread count to provide a physical barrier to prevent or reduce the spread of infectious materials or vectors. While reusable woven fabrics per se offer more comfort in terms of drapeability and hand and the potential for lower cost per use, they lack the liquid repellency the market has come to expect on the basis of experience with the disposables, and usually lose some of their protective properties over time, especially after repeated launderings and steam (autoclave) sterilizations.

Acquisition costs and the number of times a product manufactured with a protective barrier fabric such as a surgical gown can be reused, have a direct bearing on the per use cost of the product. With respect to disposable surgical gowns for instance, the per use cost is, in essence, simply their acquisition cost and the cost of disposal. Disposable gowns certainly have an advantage in convenience. However, reusable gowns have a tactile advantage in that they have a nice drapeability and feel, which is preferred over that of the disposable gowns that are fabricated of non-woven fabrics. Drapeability and feel are important factors of the "hand" of the textile fabrics employed in constructing reusable surgical gowns.

All of this is to emphasize that there is a competitive motivation to minimize the per use cost of reusable medical/surgical barrier protective apparel and products.

Importantly however, reusable surgical gowns, surgical drapes, and other non-disposable medical/surgical barrier fabric products have further requirements which distinguish them from other products or garments that incorporate barrier fabrics. To wit, after each use, a reusable surgical gown, for example, must be washed, dried and sterilized for subsequent reuse. These procedures involve harsh detergents and high temperatures which can quickly degrade the barrier properties of the gown and limit the number of times the gown can be reused.

A typical, institutional laundering/autoclaving cycle for such reusable medical/surgical products generally comprises an initial flush in which the products are soaked in water at 90°-100° F. for two to five minutes. The products are then soaked in an alkali (a pH in excess of 10) bath at 120°-150° F. for three to ten minutes to loosen dirt. Next the products are placed in a detergent bath at approximately 160° F. for approximately six to ten minutes. Next is a bleach bath at approximately 150° F. for approximately six minutes. This is followed by one or more rinsings at temperatures which may be progressively reduced from 160° F. to ambient temperature. Finally, there is an acid sour bath in which the pH is adjusted to the four to seven range, and in which a softening agent may also be employed. There is then one or more rinse baths.

The products are mechanically agitated in some, if not all of these baths. Also, following each bath, there is an extraction (spin) cycle to minimize the liquid carried over to the succeeding process.

The products are then dried in a tumbling dryer at an average temperature of 160° F. Typical drying times for products are in the order of 20 to 40 minutes. It is to be noted that there can be hot spots in such dryers, which can subject the products to temperatures in excess of 400° F.

After drying, the products are placed in an autoclave and sterilized by pressurized steam at a temperature of approximately 260° F. for at least four, and preferably about fifteen minutes.

These harsh conditions are several orders of magnitude greater than those existing in the laundering or dry cleaning of barrier fabrics incorporated in ordinary garments. In fact, many of the barrier fabrics intended for use in normal garments, such as foul weather gear, become unusable after a single, or relatively few, institutional laundering/autoclaving cycles.

Polymeric films have traditionally been used as a laminate with textile fabrics to provide barrier properties for limited use medical products such as surgical drapes and gowns constructed of disposable fabric and the art is replete with references to these laminates and medical uses thereof (e.g., U.S. Pat. Nos. 4,379,192 and 6,238,767). Microporous films and methods for making such films are taught, for example, by U.S. Pat. No. 3,844,865 and laminates employing such porous films and non-woven materials are taught, for example, in U.S. Pat. Nos. 5,560,974; 5,169,712; 6,610,163; and 5,695,868.

Typically the fabric utilized in the disposable composites is a non-woven material and the films include low basis weight polyethylenes, polypropylenes, blends including polyolefins and copolymers such as ethylene and propylene copolymers. When repeated institutional washing and sterilization cycles are attempted with these composites, these laminated film products quickly delaminate and are unable to retain many of their necessary protective barrier properties. Procedures to prevent the undesirable delamination of the barrier protective fabric during and/or after multiple wash/sterilization cycles have taken many forms: primarily by using polymer coating, impregnating or saturating techniques, and/or using these techniques with multiple layering of woven fabric, polymer, and/or polymer treated woven fabric. Maximum functionality has been achieved with these techniques by the art via the use of fluorochemical and silicone type polymers.

Early silicone woven fabric coatings tended to degrade the tactile finish or hand of the fabric and give the coated fabric side a rubberized finish which was not appealing for many fabric uses, particularly garments. The art has also struggled with coated applications of the polyorganosiloxanes in attempting to achieve high levels of resistance to liquid. Although the art has coated porous textile webs with silicone, these early silicone polymers tended to remain on the surface of the fabric, i.e., the polymer did not provide a film over the individual internal fibers and/or yarn bundles. As a result, the coatings tended to abraid and/or wash away quickly.

To get the polymer to penetrate deeper into the interstices of the fabric, saturation or impregnation techniques are used by the art. These techniques are typically accomplished by immersion of the fabric using a low viscosity, liquid silicone resin. In this manner, the low viscosity polymer fluid can flow readily into the web interstices and be adsorbed or absorbed therewithin. This immersion application of a liquid or paste composition to a fabric can be achieved, for example, by the so-called padding process wherein a fabric material is passed first through a bath and subsequently through squeeze rollers in a process sometimes called single-dip or single-dip padding. Alternatively, the fabric can be passed between squeeze rollers, the bottom one of which carries the liquid or paste composition in a process sometimes called double-dip or double-dip padding. This process however, as taught in U.S. Pat. No. 2,673,823, tends to produce a heavily silicone impregnated, rubberized material, i.e., the interstices of the fabric are usually completely filled or saturated. Such a treated web is substantially devoid of its original tactile and visual properties and instead has the characteristic rubbery properties of a cured silicone polymer.

Prior treatments of webs that force a composition into the spaces of the web have relied, to aid in the flow of the composition as taught in U.S. Pat. No. 3,594,213, on using low viscosity compositions with solvents such as water or volatile organic based solvents. However, such solvent based systems tend to deposit the polymer on the fabric in a random and inconsistent manner, creating individual spots of polymer thus limiting the overall adhesive strength of the resultant product. And, of course, solvent processing often has environmental and economic consequences relating to the removal and disposal of the solvent. Use of a non-curable solvent and heat are disclosed to reduce the viscosity of a polymeric composition for porous fabric saturation in U.S. Pat. No. 4,588,614.

Another method that has fairly successfully achieved a fabric with high liquid impermeability properties after multiple institutional launderings/autoclavings and is one of the current commercially acceptable technologies of choice, is that set forth in U.S. Pat. Nos. 5,236,532 and 5,183,702 wherein a thin film of uncured silicone in a highly viscous state is compressed between a pair of rolls onto a tightly woven fabric which had been formed with "nubs" on the contact surface and previously treated with a hydrophilic finish. The composite is subsequently cured.

Many references disclose the use of layering techniques in attempts to maximize the desirable properties of barrier fabrics. Such techniques include laminating treated fabrics, untreated fabrics, and/or porous film with an adhesive tie coat; however, these techniques exhibit the same limitations described above for solid film, laminated fabric products, e.g., delamination during abrasion or washing/sterilization cycles and, in addition, suffer from the environmental issues that arise vis-a-vis the adhesive usage. Furthermore, additional difficulties can be encountered in ensuring that the mechanical performance differential between the various layers such as the treated substrate, the adhesive, the film, etc. is balanced. For example, if shrinkage of any of the three materials mentioned above, passes the initial yield stress of either of the other materials, there will be deformation; and, if it passes the ultimate tensile strength, there will be delamination of the multilayered composite.

U.S. Pat. Nos. 4,872,220; 5,024,594; 5,180,585; 5,335,372; 5,391,423; 5,532,053; and 6,238,767 describe products that use layers of fabrics and/or polymers to prevent blood, microbes, and viruses from penetration through the fabric composites. Additionally, U.S. Pat. No. 4,991,232 describes a medical garment comprising a plurality of plies to prevent blood from penetrating through the garment. Similarly, U.S. Pat. No. 5,027,438 creates a barrier composite material by sandwiching a bacteriostatic impregnated fabric between two microporous urethane coated fabrics. Detrimentally, this layering of fabrics and/or polymers traditionally results in heavier garments and utilizes additional raw materials.

Another technique utilized in the art for realizing a low viscosity fluid polymer and using same to penetrate the interstices of a fabric is through the use of a thixotropic or pseudoplastic polymer which is applied to a fabric substrate while the polymer is under high shear. This process and products made therefrom are currently one of the technologies of choice in the commercial, medical barrier fabric arena. U.S. Pat. No. 6,071,602 discloses such a technique for controlling the bond adhesion and the effective porosity of a web and thus realizing a web that is said to be resistant to permeation by a disease causing microorganism. U.S. Pat. Nos. 6,342,280 and 6,416,613 also use the thixotropic methodology to produce a multilayered composite material which comprises shear thinning an uncured, essentially solvent free, pseudoplastic polymer; applying this liquid onto a porous substrate thereby encapsulating most of the fibers while leaving some interstitial spaces open; applying a layer of polymer to a surface of the uncured, encapsulated substrate; pressuring the layer into the uncured encapsulated substrate; and curing the completed composite. Polymers that can be successfully used in this process are said to include silicones, polyurethanes, fluorosilicones, acrylics, polytetrafluoroethylene (PTFE), neoprenes, and mixtures thereof.

An important technology in the protective barrier fabric art is that which utilizes expanded, microporous polytetrafluoroethylene (ePTFE) film. Disclosures relating to these ePTFE films usually depict them as being part of a three layer composite. For example, U.S. Pat. No. 4,433,026 teaches a barrier fabric wherein the ePTFE film is sandwiched between a woven polyester fabric and a knitted polyester fabric; U.S.

Pat. No. 5,155,867 discloses a barrier fabric undergarment wherein the ePTFE film is layered upon a hydrophilic polyurethane membrane—stretchable knit fabric composite; and U.S. Pat. No. 5,948,707 discloses non-slip cast liners wherein the ePTFE film has a discontinuous coating of an elastomer such as silicone, polyurethane and the like on one side of the film and a soft fabric adhered to the other side of the film.

While the expanded, microporous PTFE protective fabric composites are reported to retain good water repellency, and other barrier properties even after multiple laundering/autoclaving cycles, they tend to be expensive products to manufacture.

In the search for a relatively low cost material that is highly coatable into thin films on fabric substrates without the use of a solvent or expensive apparatus such as high shear generating equipment or high pressure rollers, the art, especially the art relating to the manufacture of air bags, has recently recognized the desirability of using so-called cold curing silicone compositions, in particular, those of the two component type that cross link by hydrosilation or polyaddition in order to produce a thin film elastomer. In general, the two composition parts are mixed together to form a low viscosity composition; coated on a fabric using any conventional process such as a doctor blade or knife over roll, knife over air, transfer or kiss coating, or screen printing process; and heat cured which proceeds by the polyaddition of unsaturated groups (alkenyl, e.g., vinyl-silicon groups) of one polyorganosiloxane onto hydrogens of the same or of another polyorganosiloxane. This is a highly desirable process because these thin film silicone coatings can be applied rapidly and cure quickly upon heating at relatively low temperatures to form coatings that have water repellency which is an inherent characteristic of these silicones. In addition, these coatings have excellent aging behavior, that is, they retain their properties such as their thermal and mechanical properties well over time.

Typical of these two part, cold cure siloxane systems is the composition disclosed in EP-A-0,553,840 containing:

(A) a polydiorganosiloxane having at least two alkenyl groups per molecule,
(B) a polyorganohydrogenosiloxane having at least two hydrogen atoms linked to the silicon in each molecule,
(C) a metal catalyst, the metal being of the platinum group,
(D) an adhesion promoter consisting of an epoxy-functional organosilicon compound,
(E) an inorganic filler, e.g., reinforcing fillers such as fumed titanium oxide, microparticulate silica, e.g., fumed silica, precipitated silica, pyrogenic silica and essentially non-reinforcing fillers, such as quartz powder, diatomaceous earths, iron oxides, aluminum oxides, calcium carbonate or magnesium carbonate; for example, a silica treated by an organosilane, an organosilazane, or a diorganocyclopolysiloxane is incorporated,
(F) a polyorganosiloxane resin, and
(G) optionally a compound used as a crosslinking inhibitor.

In U.S. Pat. No. 5,296,298, the aforementioned constituents (A) to (E) are again found but the adhesion promoter (D) consists of the combination of an epoxy-functional organosilicon compound with an alkoxylated silane containing, per molecule, a (meth)acryl or (meth)acryloxy group and, optionally, an aluminum chelate, while the inorganic filler (E) is given as being optional, although it is used in all the examples illustrating the invention. As examples of fillers, this document mentions fumed silica, precipitated silica, powdered quartz, diatomaceous earths, and glass beads.

It has been reported that the above-described compositions produced coatings that did not adhere sufficiently well to synthetic nylon fabric to be satisfactorily applied to air bag end-usage.

EP-A-0,681,014 discloses a two part, cold cure siloxane composition similar to the above which yields a coating with significantly improved fabric adhesion properties. The silicone coating composition described consists of a mixture formed by:

(I) at least one polyorganosiloxane having, per molecule, at least two $C_2$-$C_6$ alkenyl groups linked to the silicon,
(II) at least one polyorganosiloxane having, per molecule, at least two hydrogen atoms linked to the silicon,
(III) a catalytically effective amount of at least one catalyst, composed of at least one metal belonging to the platinum group,
(IV) an adhesion promoter,
(V) optionally a mineral filler,
(VI) optionally at least one crosslinking inhibitor, and
(VII) optionally at least one polyorganosiloxane resin, in which the adhesion promoter consists exclusively of the at least ternary combination of the following ingredients:

(IV.1) at least one alkoxylated organosilane containing, per molecule, at least one $C_2$-$C_6$ alkenyl group,
(IV.2) at least one organosilicon compound which includes at least one epoxy radical, and
(IV.3) at least one metal M chelate and/or one metal alkoxide of the general formula: $M(OJ)_n$, with n=the valency of M and J=a linear or branched $C_1$-$C_8$ alkyl, M being selected from the group consisting of: Ti, Zr, Ge, Li, Mn, Fe, Al, and Mg.

A reinforcing filler such as a pyrogenic silica appears in all of the examples of this teaching.

For reasons of economic competitiveness in the air bag fabric industry, it is highly desirable to be able to apply very thin layers of silicone, i.e., the add-on weight of the coating on the fabric should be less than 30 g/m².

To that end, U.S. Pat. No. 6,586,551 modified the '014 composition by eliminating all reinforcing filler from the composition. In this manner, it is reported that low add-on weight, coated fabrics, especially polyamide fabrics for the air bag industry, are able to be easily obtained without having a negative impact on the properties that had been realized with the filled compositions such as fire and temperature resistance, creasing and abrasion resistance, and thermal insulation; all of which were actually improved by the removal of the filler.

With a diametrically opposite approach, U.S. Pat. No. 6,562,737, in order to allow coating thickness on a substrate to be increased without increasing the weight of the coated substrate while still retaining acceptable (air bag) end use properties such as thermal resistance properties, added expandable, organic microspheres having a polymer wall to the coating composition; said spheres containing a liquid or a gas. The spheres are preferably incorporated into the coating composition before their expansion, which may then be induced by suitable heating during crosslinking of the elastomer coating.

While the efforts to prepare thinly coated barrier fabrics with required liquid and microorganism repellency have generally been acceptable, economic cost effectiveness is still an elusive target because adhesive and/or polymer bonding failures under severe usage, e.g., heavy abrasion, numerous foldings, and/or multiple harsh institutional type washing/sterilization cycles result in random delaminations, pin-holes, and breakdowns in the protective properties of the barrier fabric, which significantly shorten the potential useful life of the barrier fabric.

Accordingly, it is an object of the instant invention to realize a protective barrier fabric composite, especially a polyester containing one suitable for the medical barrier fabric market, which has excellent initial viral and liquid repellency properties and which is able to sustain those properties after at least 75 institutional laundering/autoclaving cycles and to provide a process for producing same.

SUMMARY OF THE INVENTION

The instant invention provides a process for preparing a barrier fabric, especially one suitable for reusable medical barrier fabric end-uses such as surgical apparel and drapes. The process comprises applying two coats of a solventless, unfilled, cold cure, low viscosity siloxane composition onto a woven fabric, preferably a polyester containing fabric, with the second coat on the inner side being optionally covered by a fabric, preferably by a soft natural fiber fabric.

The fabrics produced by this process realize outstanding long term impermeability properties, specifically excellent viral and liquid repellency even after an extensive number of laundering/autoclaving sterilization cycles.

DETAILED DESCRIPTION OF THE INVENTION

The instant invention relates to a selected cold cure composition and a two pass process for applying coatings of this composition to one side of a woven fabric, preferably a polyester containing fabric. In this manner, an excellent reusable, barrier fabric or barrier fabric article can be produced; specifically, one that is able to meet the stringent technical criteria required for medical viral/liquid barrier applications.

Preferably, a soft fabric is overlayed to the coated "inner" side of the woven fabric usually by sewing the coated barrier fabric i) to a pre-made textile article of manufacture such as a surgical gown or drape or (ii) to textile material prior to the material and coated barrier fabric being manufactured into an article of manufacture, such as the above mentioned surgical gown or drape.

The unfilled, solventless, cold curing siloxane composition of this invention consists essentially of:

(1) at least one polyorganosiloxane having, per molecule, at least two $C_2$-$C_6$ alkenyl groups linked to the silicon,
(2) at least one polyorganosiloxane having, per molecule, at least two hydrogen atoms linked to the silicon,
(3) a catalytically effective amount of at least one catalyst, composed of at least one metal belonging to the platinum group,
(4) an adhesion promoter consists essentially of:
    (4.1) 3-trimethoxysilylpropylmethacrylate silane (MEMO),
    (4.2) at least one organosilicon compound which includes at least one epoxy radical, and
    (4.3) at least one metal M chelate and/or one metal alkoxide of the general formula: $M(OJ)_n$, with n=the valency of M and J=a linear or branched $C_1$-$C_8$ alkyl, M being selected from the group consisting of: Ti, Zr, Ge, Li, Mn, Fe, Al and Mg,
(5) at least one polyorganosiloxane resin, and
(6) at least one crosslinking inhibitor.

With respect to the adhesion promoter (4), the 3-trimethoxysilylpropylmethacrylate silane (MEMO) (4.1) is present at from 0.5% to 5% by weight based on the total weight of the composition.

With regard to the organosilicon compound (4.2) of the adhesion promoter (4), provision is made according to the invention to select this:

either from the substances (4.2a) satisfying the following general formula:

(4.2a)

in which:
$R^6$ is a linear or branched $C_1$-$C_4$ alkyl radical,
$R^7$ is a linear or branched alkyl radical,
y is equal to 0, 1, 2 or 3, preferably equal to 0 or 1 and even more preferably equal to 0, and

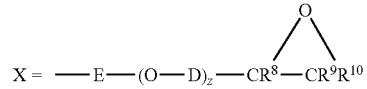

wherein
E and D are the same or different radicals and are selected from linear or branched $C_1$-$C_4$ alkyls,
z is equal to 0 or 1,
$R^8$, $R^9$, and $R^{10}$ are the same or different radicals and represent hydrogen or a linear or branched $C_1$-$C_4$ alkyl; hydrogen being more particularly preferred,
$R^8$ and $R^9$ or $R^{10}$ may alternately constitute together, and with two carbons containing the epoxy, a 5-membered to 7-membered alkyl ring,
or from the substances (4.2b) consisting of epoxy-functional polydiorganosiloxanes comprising:
at least one siloxyl functional unit of formula:

(4.2b1)

wherein
X is the radical as defined above in formula (4.2a),
G is a monovalent hydrocarbon group, free of any action unfavorable to the activity of the catalyst and selected, preferably, from an alkyl group having from 1 to 8 carbon atoms inclusive, optionally substituted by at least one halogen atom, advantageously selected from the methyl, ethyl, propyl and 3,3,3-trifluoropropyl groups, or
an aryl group, advantageously selected from the xylyl, tolyl and phenyl groups,
p=1 or 2, and
q=0, 1 or 2,
wherein p+q=1, 2 or 3,
and optionally at least one siloxyl functional unit of formula:

(4.2b2)

in which G has the same meaning as above and r has a value of between 0 and 3, preferably between 1 and 3.

Compounds (4.2) are preferably epoxyalkoxymonosilanes (4.2a).

The 4.2 compounds are present at from 0.5 to 5.0% by weight based on the total weight of the composition.

By way of examples of such compounds (4.2a), mention may be made of:
3-glycidoxypropyltrimethoxysilane (GLYMO), and
3,4-epoxycyclohexylethyltrimethoxysilane.

With regard to the essential final compound (4.3) of the adhesion promoter (4) of the silicone composition according to the instant invention, the preferred substances are those in which the metal M is selected from the group consisting of: Ti, Zr, Ge, Li, and Mn. It should be emphasized that titanium is particularly preferred. Metal M may be combined, for example, with an alkoxy radical of the butoxy type.

The 4.3 compounds of the adhesion promoter (4), are present at from 0.38 to 2.0% by weight; preferably from 0.40 to 1.0%; and most preferably from 0.45 to 0.60% by weight based on the total weight of the composition.

According to the invention, one preferred combination for forming the adhesion promoter (4) is the following:
3-trimethoxysilylpropylmethacrylate silane (MEMO),
3-glycidoxypropyltrimethoxysilane (GLYMO), and
butyl titanate.

Quantitatively, it may be specified that the weight proportions between the (4.1), (4.2) and (4.3) compounds, expressed in percentages by weight with respect to the total of the three, are as follows:
(4.1) equal to or greater than 10, preferably between 15 and 70, and even more preferably between 25 and 65,
(4.2) equal to or less than 90, preferably between 70 and 15, and even more preferably between 65 and 25, and
(4.3) equal to or greater than 1, preferably between 5 and 30, and even more preferably between 8 and 25;

it being understood that the sum of these proportions of (4.1), (4.2) and (4.3) is equal to 100%.

It has been possible to show that there is a correlation, on the one hand, between the adhesion performance and the structural performance of the silicone coating and, on the other hand, the weight ratio of (4.2):(4.1). Thus, this ratio is preferably between 2:1 and 0.5:1; the ratio 1:1 being more particularly preferred.

Preferably, the adhesion promoter is present in an amount of from 1.1 to 12, preferably 1.5 to 5, and even more preferably from 2 to 3% by weight with respect to the total constituents of the composition.

The composition according to the invention necessarily contains at least one polyorganosiloxane resin (5) containing at least one alkenyl residue in its structure, and this resin has an alkenyl group(s) weight content of between 0.1 and 20% by weight and preferably between 0.2 and 10% by weight.

These resins are well-known branched organopolysiloxane polymers or oligomers available commercially. They are in the form of solutions, preferably siloxane solutions. They have, in their structure, at least two different functional units selected from those of formula $R_3SiO_{0.5}$ (M functional unit), $R_2SiO$ (D functional unit), $RSiO_{1.5}$ (T functional unit) and $SiO_2$ (Q functional unit); at least one of these functional units being a T or Q functional unit.

The radicals R are the same or different, and are selected from linear or branched $C_1$-$C_6$ alkyl radicals and $C_2$-$C_4$ alkenyl, phenyl and 3,3,3-trifluoropropyl radicals. For example, as alkyl radicals, R may be methyl, ethyl, isopropyl, tert-butyl and n-hexyl radicals and, as alkenyl radicals, R may be vinyl radicals.

It should be understood that in the resins (5) of the aforementioned type, some of the radicals R are alkenyl radicals.

Examples of branched organopolysiloxane polymers or oligomers are MQ resins, MDQ resins, TD resins and MDT resins with the alkenyl functional groups possibly being carried by the M, D and/or T functional units. As examples of resins that are particularly well suitable, mention may be made of vinyl MDQ resins having a vinyl-group weight content of between 0.2 and 10% by weight.

This compound (5) has the function of increasing the mechanical strength of the silicone elastomer coating, as well as its adhesion. This structural resin is present in a concentration of between 10 and 70% by weight with respect to all of the constituents of the composition, preferably between 30 and 60% by weight, and even more preferably between 40 and 50% by weight.

The polyorganosiloxane resin (5) preferably contains at least 2% by weight of $SiO_2$ functional units (Q functional units), preferably from 4 to 14% and most preferably from 5% to 12%.

This polydiorganosiloxane resin (5) should have a viscosity at least equal to 1000 mPa·s and preferably between 5000 and 200,000 mPa·s.

In order of desirability, this viscosity should be between 10,000 and 200,000 mPa·s, especially between 30,000 and 170,000, and most preferably between 50,000 and 140,000. In the case of a mixture of several oils (1) of different viscosities, the viscosity of the overall mixture is recognized.

The polyorganosiloxane oil (1) is, weight-wise, one of the main constituents of the composition according to the invention. Advantageously, this is a substance containing
(i) siloxyl functional units of formula:

$$T_a Z_b SiO_{[4-(a+b)]/2} \quad (1.1)$$

wherein:
T is an alkenyl group, preferably vinyl or allyl,
Z is a monovalent hydrocarbon group, free of any action unfavorable to the activity of the catalyst and selected, preferably, from alkyl groups having from 1 to 8 carbon atoms inclusive, optionally substituted by at least one halogen atom, more preferably from methyl, ethyl, propyl and 3,3,3-trifluoropropyl groups and as well as preferably from aryl groups, more preferably from xylyl, tolyl and phenyl radicals,
a is 1 or 2,
b is 0, 1 or 2, and
a+b is between 1 and 3, preferably between 2 and 3, and
(ii) optionally other siloxyl functional units of formula:

$$Z_c SiO_{[4-c]/2} \quad (1.2)$$

wherein
Z has the same meaning as above,
c has a value of between 0 and 3, preferably between 2 and 3.

This oil (1) is present in a concentration of between 10 and 70% by weight with respect to all of the constituents of the composition, preferably between 30 and 60% by weight, and even more preferably between 40 and 60% by weight.

This polydiorganosiloxane oil should have a viscosity at least equal to 1000 mPa·s and preferably between 5000 and 200,000 mPa·s.

In order of desirability, this viscosity should be between 10,000 and 200,000 mPa·s, especially between 30,000 and 150,000, and most preferably between 40,000 and 110,000. In the case of a mixture of several oils (1) of different viscosities, the viscosity of the overall mixture is recognized.

All the viscosities involved in the present document correspond to a dynamic viscosity quantity which is measured, in a manner known per se, at 25° C.

The polyorganosiloxane oil (1) may be only formed from functional units of formula (1.1) or may contain, in addition, functional units of formula (1.2). Likewise, it may have a linear, branched, cyclic or network structure.

Z is generally selected from methyl, ethyl and phenyl radicals, at least 60 mol. % (or 60% by number) of the radicals Z being methyl radicals.

Examples of siloxyl functional units of formula (1.1) are the vinyldimethylsiloxyl functional unit, the vinylphenylmethylsiloxyl functional unit, the vinylmethylsiloxyl functional unit, and the vinylsiloxyl functional unit.

Examples of siloxyl functional units of formula (1.2) are $SiO_{4/2}$, dimethylsiloxyl; methylphenylsiloxyl, diphenylsiloxyl, methylsiloxyl and phenylsiloxyl functional units.

Examples of polyorganosiloxane oils (1) are linear and cyclic compounds such as dimethylvinylsilyl-terminated dimethylpolysiloxanes, trimethylsilyl-terminated (methylvinyl)(dimethyl)-polysiloxane copolymers, dimethylvinylsilyl-terminated (methylvinyl)(dimethyl)polysiloxane copolymers and cyclic methylvinylpolysiloxanes.

The polyhydrogenoorganosiloxane oil (2) has at least two hydrogen atoms linked to the silicone and preferably contains:

(i) siloxyl functional units of formula:

$$H_d L_e SiO_{[4-(d+e)]/2} \quad (2.1)$$

wherein:

L is a monovalent, hydrocarbon group, free of any action unfavorable to the activity of the catalyst and selected preferably (a) from alkyl groups having from 1 to 8 carbon atoms inclusive, optionally substituted by at least one halogen atom, more preferably from methyl, ethyl, propyl and 3,3,3-trifluoropropyl groups, and (b) from aryl groups, more preferably from xylyl, tolyl and phenyl radicals, d is 1 or 2, e is 0, 1 or 2, and d+e has a value of between 1 and 3, preferably between 2 and 3; and (ii) optionally other siloxyl functional units of average formula:

$$L_g Si O_{[4-g]/2} \quad (2.2)$$

wherein

L has the same meaning as above, and g has a value of between 0 and 3, preferably between 2 and 3.

The dynamic viscosity of this polyorganosiloxane (2) is at least equal to 5 mPa·s and preferably is between 10 and 100 mPa·s.

This polyhydrogenoorganosiloxane oil (2) is present in a concentration of between 2 and 10% by weight with respect to all of the constituents of the composition, preferably between 3 and 8% by weight, and even more preferably between 4 and 6% by weight.

The polyhydrogenoorganosiloxane oil (2) may be only formed from functional units of formula (2.1) or may contain, in addition, functional units of formula (2.2).

The polyhydrogenoorganosiloxane oil (2) may have a linear, branched, cyclic or network structure.

Examples of functional units of formula (2.1) are:

$$H(CH_3)_2 SiO_{1/2}, HCH_3 SiO_{2/2}, H(C_6H_5)SiO_{2/2}$$

Examples of functional units of formula (2.2) are the same as those given above for the functional units of formula (1.2).

Examples of polyhydrogenoorganosiloxane oil (2) are linear and cyclic compounds such as:

hydrogenodimethylsilyl-terminated dimethylpolysiloxanes, copolymers containing trimethylsilyl-terminated(dimethyl) (hydrogenomethyl) polysiloxane functional units, copolymers containing hydrogenodimethylsilyl-terminated (dimethyl) (hydrogenomethyl)polysiloxane functional units, trimethylsilyl-terminated hydrogenomethyl-polysiloxanes, and cyclic hydrogenomethylpolysiloxanes.

The ratio of the number of hydrogen atoms linked to the silicon in the polyhydrogenoorganosiloxane oil (2) to the total number of groups having alkenyl unsaturation in the polyorganosiloxane oil (1) and in the resin (5) is between 0.4 and 10, preferably between 0.6 and 5.

The polyaddition silicone composition bases may contain only linear polyorganosiloxanes (1) and (2) such as, for example, those described in Patents U.S. Pat. No. 3,220,972, U.S. Pat. No. 3,697,473 and U.S. Pat. No. 4,340,709, or may contain both branched or network polyorganosiloxanes (1) and (2) such as, for example, those described in U.S. Pat. Nos. 3,284,406 and 3,434,366.

Preferably, the following are employed:

at least one linear polyorganosiloxane oil (1) containing chains formed from functional units of formula (1.2) in which c=2, these being blocked at each of their ends by functional units of formula (1.1) in which a=1 and b=2, and at least one linear polyhydrogenoorganosiloxane oil (2) containing in its structure at least three hydrogen atoms linked to the silicon, these being located in the chains and/or chain ends.

Most preferably, the following are employed:

at least one linear polyorganosiloxane oil (1) containing chains formed from functional units of formula (1.2) in which c=2, these being blocked at each of their ends by functional units of formula (1.1) in which a=1 and b=2, and at least one linear polyhydrogenoorganosiloxane oil (2) containing chains formed from functional units of formula (2.1) in which d=1 and e=1 and, optionally, functional units of formula (2.2) in which g=2, these being blocked at each of their ends by functional units of formula (2.1) in which d=1 and e=2.

The catalysts (3) are also well-known. Preferably, platinum and rhodium compounds are used. Most preferably, complexes of platinum and of an organic substance are used as described in U.S. Pat. Nos. 3,159,601, 3,159,602, 3,220,972 and European Patents EP-A-0,057,459, EP-A-0,188,978 and EP-A-0,190,530 and the complexes of platinum and of the vinyl organosiloxanes described in U.S. Pat. Nos. 3,419,593, 3,715,334, 3,377,432 and 3,814,730. With the preferred catalyst, platinum, the amount by weight of catalyst (3), calculated in terms of the weight of the platinum metal, and is generally between 2 and 100 ppm, and preferably between 5 and 50 ppm; these weights being based on the total weight of the composition.

The silicone composition according to the invention also includes at least one addition-reaction retarder (6) (crosslinking inhibitor) selected from the following compounds:

polyorganosiloxanes substituted with at least one alkenyl group which may optionally be in cyclic form, tetramethylvinyltetrasiloxane being particularly preferred, pyridine, organic phosphines and phosphites, unsaturated amides, alkyl maleates, and alkynyl alcohols.

These alkynyl alcohols (cf. FR-B-1,528,464 and FR-A-2, 372,874), which form part of the preferred thermal hydrosilylation-reaction blockers, have the formula:

wherein:
R' is a linear or branched alkyl radical or a phenyl radical,
R" is H or a linear or branched alkyl radical or a phenyl radical, in which the radicals R', R" and the carbon atom in the a position with respect to the triple bond may optionally form a ring, with the proviso that the total number of carbon atoms contained in R' and R" are at least 5, preferably from 9 to 20.

The said alcohols are preferably selected from those having a boiling point greater than 250° C. The following are examples of these alcohols:
1-ethynyl-1-cyclohexanol,
3-methyl-1-dodecyn-3-ol,
3,7,11-trimethyl-1-dodecyn-3-ol,
1,1-diphenyl-2-propyn-1-ol,
3-ethyl-6-ethyl-1-nonyn-3-ol,
2-methyl-3-butyn-2-ol, and
3-methyl-1-pentadecyn-3-ol.

These α-alkynyl alcohols are commercially available products.

Such a retarder (6) is present in an amount of from 0.01 to 0.1% with respect to the total weight of the composition.

The compositions of this invention may optionally contain stabilizers that are well known in the silicone art, for example, solutions of orthophosphoric acid. Such stabilizers should preferably be present in the final compositions at from 0.01% to 0.1% based on the total weight of the composition.

In a manner known per se, one or several conventional additive(s), such as colorants for example, may be added to the silicone elastomer composition.

According to another of these aspects, the present invention relates to the use of a two-component precursor system for the silicone composition described hereinabove. Such a precursor system is in the form of two separate parts A and B, these being intended to be mixed together to form the composition; one of these parts A or B containing the catalyst (3) and only one of the species (1) or (2) of polyorganosiloxane. Another characteristic of this precursor system is that the part A or B containing the polyorganosiloxane (2) is free of compounds (4.3) of the promoter (4) and that part A or B which includes the compound (4.1) of the promoter (4) does not contain the catalyst (3). Yet another characteristic of this precursor system is that the resin (5) may be employed in part A or part B or in both parts A and B and that the catalyst (3) must not be present in the part A or B which contains the polyorganosiloxane (2) and the resin (5).

Thus, part A may, for example, contain some of the polyorganosiloxane (1), the polyorganosiloxane (2), the compounds (4.1) and (4.2) of the promoter (4), some of the resin (5) and, optionally, the crosslinking inhibitor (6), while part B may, for example, contain the remaining part of the polyorganosiloxane (1), the catalyst (3), the compound (4.3) of the promoter (4), the remaining part of the resin (5) and, optionally, a colorant base.

The viscosity of parts A and B and of their mixture may be adjusted by varying the amounts of the constituents and by selecting polyorganosiloxanes of different viscosity.

Once parts A and B have been mixed together, they form a ready-to-use cold curable silicone composition which may be applied to the substrate by any suitable coating means, for example, a doctor blade or roller.

Although the composition applied to the substrate to be coated is able to cross-link cold, i.e., at a temperature close to room temperature (23° C.), it should be noted that the compounds according to the invention may also be cross-linked in an accelerated manner thermally and/or by electromagnetic radiation (electron beam).

The compositions according to the invention may be used for covering or coating porous, flexible substrates, especially woven, knitted or non-woven fibrous substrates, preferably woven fabric made of fibers natural or synthetic in origin, or mixtures thereof. Examples include cotton, wool silk, jute, linen, acetate, polyesters (including polyethyleneterephthalate), polyamides (including nylon), acrylics, olefins, aramids, azions, glasses, modacrylics, novoloids, nytrils, rayons, sarans, spandex, vinyl, vinyon, regenerated cellulose, cellulose acetates, and the like. Blends of natural and synthetic fibers can also be used. Most preferably, the fabric is composed of polyester fibers.

The medical fabrics of this invention are preferably woven from 100% polyester filament yarn (nylon lacks durability and is usually unsuited for medical barrier fabric purposes). To obtain a desirable fabric density, the yarn denier will generally fall in the range of from 50 to 150 in combination with a sum of the ends and picks (sometimes called a "round count") of at least 100 per inch.

The woven fabric, prior to finishing, has a weight of from about 60 to 300 g/m$^2$, preferably 60 to 180 g/m$^2$ with about 75 g/m$^2$ being the most desired value.

Prior to coating, the woven fabric is usually washed and dried to remove extraneous material such as lint and then preferably given a treatment bath using any standard, convenient textile finishing equipment wherein various additives may be applied to the fabric prior to the coating operations. Typical additives comprise antimicrobial agents such as 3-(trimethoxysilyl)-propyloctadecyldimethyl ammonium chloride; antistatic compounds such as the quarternary ammonium and alkyl amine compounds; and flame retardants such as the cyclic phosphonate esters; all of which are well known in the art (see for example U.S. Pat. No. 4,919,998). Hydrophilic finishes may also be applied to the hydrophobic polyester fabric prior to the coating treatment, as disclosed in U.S. Pat. No. 5,183,702.

After the fabric is treated with any of the above additives, it is dried to remove moisture before further processing.

In the process of this invention, the polyorganosiloxane coating composition is applied with two passes to one side of the polyester fabric using conventional high speed applicators such as a doctor blade and roller: the first pass applies an add-on, first lower coat weight onto the fabric in the range of from 10 to 45 g/m$^2$ and the second pass applies a secondary higher weight coat onto the first coat of from 20 to 105 g/m$^2$ for a total polymer composition add-on weight of from 30 to 150 g/m$^2$.

The two pass application process has at least two major advantages over the single pass process. At the outset, by applying a second coat on top of the first one, any possible pin-holes or areas of un-coated material are virtually eliminated and significantly, additional mechanical pressure is applied to force the polymer composition into the fabric. To wit, when a single, heavy add-on weight coating is used, the doctor blade is set away from the substrate to permit the larger amount of the polymer composition to flow onto the fabric and thus, very little pressure is applied directly onto the fabric by the doctor blade. However, with the first application of a very thin, light add-on weight coat, the blade is actually so close to the surface of the fabric that there is a mechanical pressure applied almost directly to the fabric. As a result, the low viscosity, polymeric composition is essentially pushed into the interstices of the textile fabric. This additional pressure is of significant importance, especially with fabric intended for medical purposes, e.g., surgical gowns and drapes, for such fabrics are very tightly woven, i.e., they have very smooth surfaces and the interstices are extremely small.

The uncured coated fabric is conventionally passed through heated ovens to accelerate the curing of the elastomer coating; usually from fifteen seconds to four minutes at from about 180°-220° C.; the optimum time and temperature being easily determined based on the composition, coating thickness, etc. With the two-pass process of the instant invention, the curing of the first applied, lower add-on weight coat is delayed or cured more slowly to allow the low viscosity composition to penetrate the fabric more effectively. One of the methods for accomplishing this delay in curing is to merely use a lower temperature in the initial stages of the oven. For example, conventional ovens may be from about 30 to 90 feet in length and consist from about two to twelve individual stages, chambers, or heating units. Whereas conventionally, the stages are heated from about 180° C. in the first unit rising to about 220° C. in the final unit, in the process of the instant invention, the first coat may be cured with the initial unit having a temperature of only about 150° C. Serendipitously, the heat in this low temperature, initial cure actually, at first, causes the viscosity of the polymer composition to decrease before the reaction inhibitor(s) have had an opportunity to volatilize and the curing begins. This, of course, aids in the penetration of the fabric by the first coat material before the cross-linking with its attendant solidification occurs. One could say that the first coat of this invention to essentially "priming" the surface of the fabric.

After the first coat has essentially cured or is at least partially cured, the second, higher add-on weight coat is applied over the first coat and rapidly cured using conventional times and temperatures.

In use, the un-coated side of the coated fabric faces the potentially contaminated or hazardous environment, e.g., the one possibly containing body fluids and/or infectious microorganisms (hereinafter the outside surface of the coated fabric) and the polyorganosiloxane composition coated side of the coated fabric faces the surface to be protected such as the body of a health professional or areas of a surgical field (hereinafter the inner surface of the coated fabric).

In order to render the inner surface of the coated fabric more aesthetically pleasing and to give it a pleasant tactile quality, since, for example, with its use in medical apparel, it could be in contact with the skin of a medical professional, a soft fabric liner, i.e., an inner ply, preferably one composed of natural fibers or natural/synthetic fiber blends, is preferably overlayed onto the silicone coated, inner surface of the coated fabric. Examples of such liners include those composed of linen, cotton, and cotton/polyester blends. It is also envisioned that the inner surface of the coated fabric can be overlayed and usually sewn onto i) a pre-made textile article of manufacture such as a surgical gown or drape, especially in areas that need special protection such as the front (like an apron) and sleeves of the gown; or ii) a textile material prior to the material and coated barrier fabric being manufactured into articles such as the above exemplified surgical gown or drape.

Of primary importance in evaluating the durability or usefulness of a barrier fabric, especially one utilized as a medical barrier fabric, are the results of the hydrostatic resistance tests such as ASTM D 751 (A), the Mullen type hydrostatic test and ASTM D 751 (B), the HydroSuter test. In the Mullen test, the coated side of a fabric is exposed to a fluid, usually water, at increasingly higher pressures and the pressure at which the fabric "leaks" is recorded. Of significance to the medical barrier fabric art is the number of laundering/autoclaving cycles the fabric can withstand before "leak through" occurs.

In the HydroSuter test, the coated fabric is placed in the column of an apparatus with the outer surface—the surface normally facing the potentially hazardous environment—facing a rising column of water, i.e., coated side facing the water. Thus, not only does the elastomeric coating have to be absolutely non-permeable to liquids, but it also has to demonstrate excellent adhesion to the fabric with stretching properties to avoid a rupture under the stress of the increasing head of water. In this test, a coated substrate fails as soon as a drop of water appears or if the material ruptures. As with the Mullen test, of significance is the number of laundering/autoclaving cycles the fabric can withstand before the drop appears.

Although this invention provides an improved barrier fabric that is able to meet the most stringent criteria of a medical barrier fabric industry, it should be understood that this invention is not limited to that field and in fact the process and products produced using same, may be employed in any application requiring similar properties such as for tent fabrics, out-door clothing and covers, etc.

As used herein, the term "consisting essentially of" does not exclude the presence of additional materials which do not significantly affect the desired characteristics of a given composition or product.

Other than in the operating examples, or where otherwise indicated, all numbers expressing quantities of ingredients or reaction conditions used herein are to be understood as modified in all instances by the term "about".

The following examples demonstrating the preparation of the composition and of its application as a coating for a polyester medical barrier fabric, will enable the invention to be more clearly understood and will enable its advantages and its alternative embodiments to be apparent. The examples are not meant, in any way, to limit the invention. The enhanced performance characteristics of this invention will be demonstrated by comparative tests.

All percentages and ratios will be considered to be by weight unless otherwise indicated.

The specific laundering/autoclaving cycle used in the following examples is as set forth in the following Table 1:

TABLE 1

Textile Wash Procedures

| Operation | Time | Water Level | Temp | Detergent | pH |
|---|---|---|---|---|---|
| Flush | 2 min. | — | Warm | — | 7 |
| Break | 8 min. | Low | 150° F. | Det. Alkali | 10.5 |
| Suds | 6 min. | Low | 160° F. | Detergent | 9 |
| Bleach | 6 min. | Low | 150° F. | Bleach | 8.5 |
| Rinse | 2 min. | High | 160° F. | — | 8 |
| Rinse | 2 min. | High | 140° F. | — | 7.5 |
| Finish | 3 min. | Low | 110° F. | Anti-Chlor | 7 |
| Extract | 1 min. | — | — | — | — |
| Rinse | 2 min. | High | 110° F. | — | 7 |
| Sour | 5 min. | Low | 100° F. | Sour | 7 |
| Extract | 2 min. | — | — | — | — |

After drying, the fabric is sterilized with an autoclave cycle at 260° F. for approximately 15 minutes.

In these examples, the viscosity is measured using a Brookfield viscometer at room temperature.

EXAMPLE I

Preparation of a Filled Silicone Coating Composition

Comparative Ex. 1

1.1—Preparation of Part A of the Two Component System:

The following are introduced into a reactor at room temperature:

47.7 parts of a previously prepared mixture of the following:
- (a) 40% by weight of a resin having a $MM^{Vi}DD^{Vi}Q$ structure containing 0.8% by weight of vinyl groups (Vi) and consisting of 27% by weight of $(CH_3)_3SiO_{0.5}$ functional units, 0.15% by weight of $(CH_3)_2ViSiO_{0.5}$ functional units, 60% by weight of $(CH_3)_2SiO$ functional units, 2.4% by weight of $(CH_3)ViSiO$ functional units and 9.6% by weight of $SiO_2$ functional units [this constituent being called hereafter Resin (5)]; and
- (b) 60% by weight of a resin which is a polyorganosiloxane terminated at each of the chain ends by a $(CH_3)_2ViSiO_{0.5}$ functional unit having a viscosity of 60,000 mPas [this constituent being called hereafter Diluent A].

27 parts by weight of a high-viscosity oil of a polyorganosiloxane consisting of a polydimethylsiloxane oil terminated at each of the chain ends by a $(CH_3)_2ViSiO_{0.5}$ functional unit, having a viscosity of 100,000 mPa·s and containing 0.003 Vi-Si functional groups per 100 g of oil [this constituent being called hereafter High-viscosity Oil (1)];

16 parts of calcium carbonate ($CaCO_3$) sold commercially as Albacar 5970 which has not been subjected to a compatibleness treatment such as heating or adding functionality to the surface of the material: this filler being often used to strengthen sewn seams and add tear resistance to fabrics;

6 parts by weight of an oil of a polyorganosiloxane consisting of a poly(dimethyl)(hydrogenomethyl) siloxane oil terminated at each of the chain ends by a $(CH_3)_2HSiO_{0.5}$ functional unit, having a viscosity of 25 mPa·s and containing in total 0.7H—Si functional groups per 100 g of oil (of which 0.6H—Si functional groups lie within the chain) [this constituent being called hereafter Oil (2)];

1 part by weight of compound (4.1) of the promoter (4), consisting of vinyltrimethoxysilane [this constituent being called hereafter VTMO (4.1)]; and 1 part by weight of compound (4.2) of the promoter (4), consisting of 3-glycidoxypropyltrimethoxysilane [this constituent being called hereafter GLYMO (4.2)].

1.2—Preparation of Part B of the Two-component System:

The following are introduced into a reactor at room temperature:

45 parts of a previously prepared mixture of the following:
- (a) 40% by weight of a resin having a $MM^{Vi}DD^{Vi}Q$ structure containing 0.8% by weight of vinyl groups (Vi) and consisting of 27% by weight of $(CH_3)_3SiO_{0.5}$ functional units, 0.15% by weight of $(CH_3)_2ViSiO_{0.5}$ functional units, 60% by weight of $(CH_3)_2SiO$ functional units, 2.4% by weight of $(CH_3)ViSiO$ functional units and 9.6% by weight of $SiO_2$ functional units [this constituent being called hereafter Resin (5)]; and
- (b) 60% by weight of a resin which is a polyorganosiloxane terminated at each of the chain ends by a $(CH_3)_2ViSiO_{0.5}$ functional unit having a viscosity of 60,000 mPas [this constituent being called hereafter Diluent A].

51 parts by weight of a high-viscosity oil of a polyorganosiloxane consisting of a polydimethylsiloxane oil terminated at each of the chain ends by a $(CH_3)_2ViSiO_{0.5}$ functional unit, having a viscosity of 100,000 mPa·s and containing 0.003 Vi-Si functional groups per 100 g of oil [this constituent being called hereafter High-viscosity Oil (1)];

4 parts by weight of compound (4.3) of the promoter (4), consisting of butyl titanate $Ti(OBu)_4$ [this constituent being called hereafter TBT (4.3)]; and 0.02 part by weight of a platinum metal catalyst, introduced in the form of an organometallic complex containing 10% by weight of platinum metal, known by the name Karstedt catalyst [this constituent being called hereafter Platinum Catalyst (3)].

1.3—Preparation of the Coating Composition:

The coating composition is obtained by mixing, at room temperature, 100 parts by weight of part A and 10 parts by weight of part B. The control comparative composition is thus obtained.

EXAMPLE II

Use of Filled Silicone Coating Composition of Example I for Coating Woven Polyester Fabric 2.1—Application Protocol:

The composition of Example I is deposited on a 70 denier woven polyester fabric using a regular knife over roller process. The coating composition is deposited in a single pass with an add-on weight to the fabric of approximately 135 g/m². The elastomeric coating is then crosslinked in an oven for 80 seconds at 180° C. to effect the cure.

The coated fabric was then subjected to numerous laundering/autoclaving/drying cycles as set forth above and samples of the fabric were tested at regular intervals to determine if sufficient protective barrier qualities were being sustained.

2.2—Results:

The results as depicted by the failure counts that occurred while conducting the Mullen and HydroSuter tests on the barrier fabrics prepared by the method of Example II above, indicate that significant delamination of the coating from the woven polyester substrate was occurring and thus the protective barrier was breaking down between 25 and 50 laundering/autoclaving/drying cycles.

EXAMPLE III

Use of Filled Silicone Coating Composition of Example I for Coating Woven Polyester Fabric: Process Improvement 1

3.1—Application Protocol:

As in Example 2.1, the composition of Example I is deposited on a 70 denier woven polyester fabric using a regular knife over roller process. However, the coating composition is deposited in two passes; the first coat being a lower add-on weight coat of about 37 g/m² and the second coat, applied on top of the first coat, being one with a higher add-on weight coat of about 98 g/m²: the total add-on weight to the fabric remaining at approximately 135 g/m² as in the 2.1 Example. The first elastomeric coating is cross-linked in an oven for 60 seconds starting at 180° C. and ending at 200° C. to effect the cure before the secondary coating is applied. The dual coated fabric is then sent through the oven again for 80 seconds starting at 180° C. and ending at 200° to effect the cure of the second coat.

The coated fabric was then subjected to numerous laundering/autoclaving/drying cycles as set forth above and samples of the fabric were tested at regular intervals to determine if sufficient protective barrier qualities were being sustained.

3.2—Results:

The results as depicted by the failure counts that occurred while conducting the Mullen and HydroSuter tests on the barrier fabrics prepared by the method of Examples III above, indicate that, although there was a slight improvement over the single pass method of Example II, a fair amount of delamination of the coating from the woven polyester substrate was still occurring and that the protective barrier was breaking down at about 50 laundering/autoclaving/drying cycles.

EXAMPLE IV

Use of Filled Silicone Coating Composition of Example I for Coating Woven Polyester Fabric: Process Improvement 2

4.1—Application Protocol:

As in Example 3.1, the composition of Example I is deposited on a 70 denier woven polyester fabric using a regular knife over roller process. Also as in Example 3.1, the coating composition is deposited in two passes; the first coat being a lower add-on weight coat of about 37 g/m² and the second coat, applied on top of the first coat, being one with a higher add-on weight coat of about 98 g/m²: the total add-on weight to the fabric remaining at approximately 135 g/m². However, the first elastomeric coating is cross-linked in an oven for 60 seconds starting at 150° C. and ending at 200° C. in order to delay the cross-linking process to permit the lightly coated, low viscosity, uncured polysiloxane composition to penetrate deeper into the woven polyester fabric before curing and before the secondary coating is applied. The dual coated fabric is then sent through the oven again for 80 seconds starting at 180° C. and ending at 200° C. to rapidly effect the cure of the second coat.

The coated fabric was then subjected to numerous laundering/autoclaving/drying cycles as set forth above and samples of the fabric were tested at regular intervals to determine if sufficient protective barrier qualities were being sustained.

4.2—Results:

The results as depicted by the failure counts that occurred while conducting the Mullen and HydroSuter tests on the barrier fabrics prepared by the method of Example IV above, indicate that, although again there was a slight improvement over the dual pass, rapid curing method of Example III, some delamination of the coating from the woven polyester substrate was still occurring for the protective barrier was breaking down between about 50 and 75 laundering/autoclaving/drying cycles.

EXAMPLE V

Preparation of a Silicone Coating Composition of this Invention 5.1—Preparation of Part A of the Two-component System:

The following are introduced into a reactor at room temperature:

44.6 parts by weight of a vinyl terminated polydimethylsiloxane oil of viscosity 100,000 cps and a mean average molecular weight of about 110,000 g/mol [this constituent being called hereafter High Viscosity Oil (1)];

47.7 parts by weight of a mix of MDViQ resin (40%) and vinyl terminated polydimethylsiloxane oil of viscosity 60,000 cps having a mean average molecular weight of about 90,000 g/mol (60%) [this constituent being called hereafter Resin (5)];

5.6 parts by weight of a polyhydrogenoorganosiloxane crosslinker containing hydrogen atoms linked to a silicon atom at the ends of the chain and on the chain at regular intervals. It has a viscosity of 25 cps with an average mean molecular weight of 2,500 with 0.7% weight of hydrogen atoms. [this constituent being called hereafter Oil (2)];

0.025 parts by weight of an inhibitor consisting of 1-ethynyl-1-cyclohexanol [this constituent being called hereafter Inhibitor (6)];

1 part by weight of compound (4.1) of the promoter (4), consisting of an alkoxylated organosilane with a vinyl functionality namely 3-trimethoxysilylpropylmethacrylate [this constituent being called hereafter MEMO (4.1)];

1 part by weight of compound (4.2) of the promoter (4), consisting of an epoxy functional alkoxylated organosilane, namely 3-glycidoxypropyl-trimethoxysilane [this constituent being called hereafter GLYMO (4.2)]; and 0.025 of a stabilizer based on orthophosphoric acid ($H_3PO_4$) [this constituent being called hereafter SOL 110].

5.2—Preparation of Part B of the Two-component System:

The following are mixed in a reactor at room temperature:

50.4 parts by weight of a vinyl terminated polydimethylsiloxane oil of viscosity 100,000 cps and a mean average molecular weight of about 110,000 g/mol [Oil (1)];

44.45 parts by weight of a mix of MDViQ resin (40%) and vinyl terminated polydimethylsiloxane oil of viscosity 60,000 cps having a mean average molecular weight of about 90,000 g/mol (60%) [Resin (5)];

0.0215 part by weight of a platinum metal catalyst, namely chloroplatinic acid [Platinum Catalyst (3)]; and 4.95 parts by weight of compound (4.3) of the promoter (4), consisting of an alkoxy-titanium compound which acts as an adhesion promoter as well as a condensation catalyst for the adhesion promoter system, namely butyl titanate $Ti(OBu)_4$ [TBT (4.3)].

5.3—Preparation of the Two-component System:

The two-component system is obtained by mixing, at room temperature, 100 parts by weight of part A and 10 parts by weight of part B. The total composition of this composition is set forth in Table II.

TABLE II

| Polysiloxane Composition Total Parts | |
| --- | --- |
| Component | Example V |
| Resin 5 | 47.4 |
| Oil 1 | 45.13 |
| Oil 2 | 5.09 |
| Inhibitor 6 | 0.023 |
| Platinum Catalyst 3 | 0.0025 |
| Compound 4.1: MEMO | 0.91 |
| Compound 4.2: GLYMO | 0.91 |
| Compound 4.3: TBT | 0.45 |
| Stabilizer: SOL 110 | 0.023 |

The significant differences between the composition of the prior fabric coating art as exemplified by the composition of Comparative Example I and the composition of the instant invention as exemplified by the composition in Example V are a) the absence of any filler material, reinforcing or otherwise; b) the increase of the adhesion promoter catalyst level, i.e., the Ti (OBu)$_4$ (TBT) is increased from 0.36 to 0.45 percent based on the total weight of the composition; and c) the presence of a cross-linking inhibitor which, among other advantages, allows a viscosity decrease in the oven of the first coat prior to cross-linking.

EXAMPLE VI

Use of The Silicone Coating Composition of Example VI for Coating Woven Polyester Fabric: Process Improvement 3

6.1—Application Protocol:

The composition of Example V, a composition of the instant invention, is deposited on a 70 denier woven polyester fabric using a regular knife over roller process. As in Example 4.1, the coating composition is deposited in two passes; the first coat being a lower add-on weight coat of about 37 g/m$^2$ and the second coat, applied on top of the first coat, being one with a higher add-on weight coat of about 98 g/m$^2$: the total add-on weight to the fabric remaining at approximately 135 g/m$^2$. Also as in Example 4.1, the first elastomeric coating is cross-linked for about 60 seconds in an oven starting at 150° C. and ending at 200° C. in order to delay the cross-linking process to permit the lightly coated, low viscosity, uncured polysiloxane composition to penetrate deeper into the woven polyester fabric before curing and before the secondary coating is applied. The dual coated fabric is then sent through the oven again for about 80 seconds starting at 180° C. and ending at 200° C. to rapidly effect the cure of the second coat.

The coated fabric was then subjected to numerous laundering/autoclaving/drying cycles as set forth above and samples of the fabric were tested at regular intervals to determine if sufficient protective barrier qualities were being sustained.

6.2—Results:

The results as depicted by the failure counts that occurred while conducting the Mullen and HydroSuter tests on the barrier fabrics prepared by the process of Example VI above, indicate that there was a significant increase in the number of laundering/autoclaving/drying cycles that the fabric could undergo before any signs of a breakdown in the coating protection was observed. Unexpectedly, the coated fabric was able to undergo greater than 75 of the extremely harsh laundering/autoclaving/drying cycles without any loss of the protective properties or delamination of the coating from the woven polyester substrate.

The metes and bounds of the instant discovery are as set forth in the following paragraphs.

What is claimed is:

1. A process for producing a barrier fabric comprising the steps of
preparing a coating composition consisting essentially of
(1) at least one polyorganosiloxane oil having, per molecule, at least two $C_2$-$C_6$ alkenyl groups linked to the silicon,
(2) at least one polyhydrogenoorganosiloxane oil having, per molecule, at least two hydrogen atoms linked to the silicon,
(3) a catalytically effective amount of at least one catalyst, comprised of at least one metal belonging to the platinum group,
(4) an adhesion promoter consisting essentially of:
(4.1) 3-trimethoxysilylpropylmethacrylate silane (MEMO),
(4.2) at least one organosilicon compound which includes at least one epoxy radical, and
(4.3) from 0.38 to 2.0% by weight based on the total weight of the coating composition of at least one metal M chelate and/or one metal alkoxide of the general formula: M(OJ)$_n$, with n equal to the valency of M and J equal to a linear or branched $C_1$-$C_8$ alkyl, M being selected from the group consisting of: Ti, Zr, Ge, Li, Mn, Fe, Al and Mg,
(5) at least one polyorganosiloxane resin having at least two different functional units selected from the group consisting of $R_3SiO_{0.5}$ (M functional unit), $R_2SiO$ (D functional unit), $RSiO_{1.5}$ (T functional unit), and $SiO_2$ (Q functional unit) wherein at least one of the functional units is a T or Q functional unit, in which the R radicals are the same or different and are linear or branched $C_1$-$C_6$ alkyl, $C_2$-$C_4$ alkenyl, phenyl or 3,3,3-trifluoropropyl radicals, said resin having an alkenyl group weight content of between 0.1 and 20% by weight, and
(6) at least one cross-linking inhibitor;
applying a first coat on one side of a woven textile fabric with from 10 to 45 g/m$^2$ of the coating composition;
curing, at least partially, the first coat;
applying a second coat onto the at least partially cured first coat with from 20 to 105 g/m$^2$ of the coating composition, the exposed surface of the second coat now considered the inner surface of the fabric and the uncoated surface of the fabric now considered the outer surface; and
curing the second coat, with the proviso that the rate of curing of said first coat is lower than that of the rate of curing of the second coat.

2. The process of claim 1 comprising the additional step of:
overlaying a second fabric to the inner surface of the coated barrier fabric.

3. The process of claim 1 wherein in the coating composition:
the polyorganosiloxane oil having, per molecule, at least two $C_2$-$C_6$ alkenyl groups linked to the silicon, is present at from 10 to 70% by weight;
the polyhydrogenoorganosiloxane oil having, per molecule, at least two hydrogen atoms linked to the silicon, is present at from 2 to 10% by weight;
the adhesion promoter is present at from 1.1 to 12% by weight;
the resin is present at from 10 to 70% by weight; and
the cross-linking inhibitor is present at from 0.01 to 0.1% by weight, all of the above weight percents being based on the total weight of the composition.

4. The process of claim 1 wherein the organosilicon compound of the adhesion promoter comprises:
either the following general formula:

in which:
R$^6$ is a linear or branched C$_1$-C$_4$ alkyl radical,
R$^7$ is a linear or branched alkyl radical,
y is equal to 0, 1, 2 or 3, and

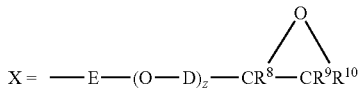

wherein
  E and D are the same or different linear or branched C$_1$-C$_4$ alkyls,
  z is equal to 0 or 1,
  R$^8$, R$^9$, and R$^{10}$ are the same or different radicals and are hydrogen or a linear or branched C$_1$-C$_4$ alkyl,
  R$^8$ and R$^9$ or R$^{10}$ may alternately constitute together, and with two carbons containing the epoxy, a 5-membered to 7-membered alkyl ring,
or epoxy-functional polydiorganosiloxanes comprising:
at least one siloxyl functional unit of formula:

$$X_pG_qSiO_{[4-(p+q)]/2} \quad (4.2b1)$$

wherein
  X is the radical as defined above in formula (4.2a),
  G is a monovalent hydrocarbon group, free of any action unfavorable to the activity of the catalyst,
  p=1 or 2, and
  q=0, 1 or 2,
  wherein p+q=1, 2 or 3,
  and optionally at least one siloxyl functional unit of formula:

$$G_rSiO_{[4-r]/2} \quad (4.2b2)$$

in which G has the same meaning as above and r has a value of between 0 and 3.

5. The process of claim 4 wherein the organosilicon compound of the adhesion promoter is 3-glycidoxypropyltrimethoxysilane (GLYMO).

6. The process of claim 1 wherein the metal alkoxide of the adhesion promoter is an alkoxy titanium.

7. The process of claim 6 wherein the alkoxy titanium of the adhesion promoter is butyl titanate.

8. The process of claim 1 wherein the adhesion promoter consists essentially of:
  3-trimethoxysilylpropylmethacrylate silane (MEMO),
  3-glycidoxypropyltrimethoxysilane (GLYMO), and
  butyl titanate.

9. The process of claim 8 wherein the weight proportions of the components of the adhesion promoter, expressed in percentages by weight based on the total weight of the adhesion promoter is as follows:
  MEMO is present in the range of from 15 to 70% by weight;
  the organosilicon compound is present in the range of from 70 to 15% by weight; and
  the metal chelate or alkoxide is present in the range of from 5 to 30% by weight.

10. The process of claim 1 wherein the polyorganosiloxane oil having, per molecule, at least two C$_2$-C$_6$ alkenyl groups linked to the silicon, is comprised of:
  (i) siloxyl functional units of formula:

$$T_aZ_bSiO_{[4-(a+b)]/2} \quad (1.1)$$

wherein:
  T is an alkenyl group, preferably vinyl or allyl,
  Z is a monovalent hydrocarbon group, free of any action unfavorable to the activity of the catalyst,
  a is 1 or 2,
  b is 0, 1 or 2, and
  a+b is between 1 and 3, and
  (ii) optionally other siloxyl functional units of formula:

$$Z_cSiO_{[4-c]/2} \quad (1.2)$$

wherein
  Z has the same meaning as above, and
  c has a value of between 0 and 3.

11. The process of claim 1 wherein the polyhydrogenoorganosiloxane oil having, per molecule, at least two hydrogen atoms linked to the silicon, is comprised of:
  (i) siloxyl functional units of formula:

$$H_dL_eSiO_{[4-(d+e)]/2} \quad (2.1)$$

wherein:
  L is a monovalent, hydrocarbon group, free of any action unfavorable to the activity of the catalyst,
  d is 1 or 2,
  e is 0, 1 or 2, and
  d+e has a value of between 1 and 3, and
  (ii) optionally other siloxyl functional units of average formula:

$$L_gSiO_{[4-g]/2} \quad (2.2)$$

wherein
  L has the same meaning as above, and
  g has a value of between 0 and 3.

12. A process for producing barrier fabric comprising the steps of
preparing a coating composition consisting essentially of
  (1) at least one polyorganosiloxane oil having, per molecule, at least two C$_2$-C$_6$ alkenyl groups linked to the silicon comprised of:
  (i) siloxyl functional units of formula:

$$T_aZ_bSiO_{[4-(a+b)]/2} \quad (1.1)$$

wherein:
  T is an alkenyl group, preferably vinyl or allyl,
  Z is a monovalent hydrocarbon group, free of any action unfavorable to the activity of the catalyst,
  a is 1 or 2,
  b is 0, 1 or 2, and
  a+b is between 1 and 3, and
  (ii) optionally other siloxyl functional units of formula:

$$Z_cSiO_{[4-c]/2} \quad (1.2)$$

wherein
  Z has the same meaning as above, and
  c has a value of between 0 and 3
  (2) at least one polyhydrogenoorganosiloxane oil having, per molecule, at least two hydrogen atoms linked to the silicon comprised of:
  (i) siloxyl functional units of formula:

$$H_dL_eSiO_{[4-(d+e)]/2} \quad (2.1)$$

wherein:
  L is a monovalent, hydrocarbon group, free of any action unfavorable to the activity of the catalyst,
  d is 1 or 2,
  e is 0, 1 or 2, and
  d+e has a value of between 1 and 3, and (ii) optionally other siloxyl functional units of average formula:

$$L_g SiO_{[4-g]/2} \qquad (2.2)$$

wherein
L has the same meaning as above, and
g has a value of between 0 and 3.
  (3) a catalytically effective amount of at least one catalyst comprised of at least one metal belonging to the platinum group,
  (4) an adhesion promoter consisting essentially of: 3-trimethoxysilylpropylmethacrylate silane (MEMO),
    at least one organosilicon compound comprised of:
(i) siloxyl functional units of formula:

$$H_d L_e SiO_{[4-(d+e)]/2} \qquad (2.1)$$

wherein:
L is a monovalent, hydrocarbon group, free of any action unfavorable to the activity of the catalyst,
d is 1 or 2,
e is 0, 1 or 2, and
d+e has a value of between 1 and 3, and
(ii) optionally other siloxyl functional units of average formula:

$$L_g SiO_{[4-g]/2} \qquad (2.2)$$

wherein
L has the same meaning as above, and
g has a value of between 0 and 3, and
  from 0.38 to 2.0% by weight based on the total weight of the coating composition of alkoxy titanium,
  (5) at least one polyorganosiloxane resin having at least two different functional units selected from the group consisting of $R_3SiO_{0.5}$ (M functional unit), $R_2SiO$ (D functional unit), $RSiO_{1.5}$ (T functional unit), and $SiO_2$ (Q functional unit) wherein at least one of the functional units is a T or Q functional unit, in which the R radicals are the same or different and are linear or branched $C_1$-$C_6$ alkyl, $C_2$-$C_4$ alkenyl, phenyl or 3,3,3-trifluoropropyl radicals, said resin having an alkenyl group weight content of between 0.1 and 20% by weight, and
  (6) at least one cross-linking inhibitor selected from the group consisting of:
    polyorganosiloxanes substituted with at least one alkenyl group which may optionally be in cyclic form,
    pyridine,
    organic phosphines and phosphites,
    unsaturated amides,
    alkyl maleates, and
    alkynyl alcohols.
applying a first coat on one side of a woven textile fabric with from 10 to 45 g/m² of the coating composition;
curing, at least partially, the first coat;
applying a second coat onto the at least partially cured first coat with from 20 to 105 g/m² of the coating composition, the exposed surface of the second coat now considered the inner surface of the fabric and the uncoated surface of the fabric now considered the outer surface; and
curing the second coat, with the proviso that the rate of curing of said first coat is lower than that of the rate of curing of the second coat.

13. A process for producing barrier fabric comprising the steps of
preparing a coating composition consisting essentially of
  (1) a mixture of 40 weight % MDViQ resin and 60 weight % vinyl terminated polydimethylsiloxane oil having a viscosity of 60,000 cps and an average mean molecular weight of 90,000,
  (2) a polyhydrogenoorganosiloxane oil crosslinker containing hydrogen atoms linked to a silicon atom at the ends of the chain and on the chain at regular intervals having a viscosity of 25 cps and an average mean molecular weight of 2,500 and 0.7% by weight of hydrogen atom,
  (3) a catalytically effective amount of chloroplatinic acid,
  (4) an adhesion promoter consisting essentially of:
    3-trimethoxysilylpropylmethacrylate silane (MEMO),
    3-glycidoxypropyltrimethoxysilane (GLYMO), and
    from 0.38 to 2.0% by weight based on the total weight of the coating composition of butyl titanate,
  (5) a vinyl terminated polydimethylsiloxane oil having a viscosity of 100,000 cps with an average mean molecular weight of 110,000 g/mol, and
  (6) 1-ethynyl-1-cyclohexanol;
applying a first coat on one side of a woven textile fabric with from 10-45 g/m² of the coating composition;
curing, at least partially, the first coat;
applying a second coat onto the at least partially cured first coat with from 20-105 g/m² of the coating composition, the exposed surface of the second coat now considered the inner surface of the fabric and the uncoated surface of the fabric now considered the outer surface; and
curing the second coat, with the proviso that the rate of curing of said first coat is lower than that of the rate of curing of the second coat.

14. The process of claim 13 comprising the additional steps of:
overlaying a second fabric to the inner surface of the coated barrier fabric.

15. A barrier fabric produced by a process comprising the steps of:
preparing a coating composition consisting essentially of
  (1) at least one polyorganosiloxane oil having, per molecule, at least two $C_2$-$C_6$ alkenyl groups linked to the silicon,
  (2) at least one polyhydrogenoorganosiloxane oil having, per molecule, at least two hydrogen atoms linked to the silicon,
  (3) a catalytically effective amount of at least one catalyst, comprised of at least one metal belonging to the platinum group,
  (4) an adhesion promoter consisting essentially of:
    (4.1) 3-trimethoxysilylpropylmethacrylate silane (MEMO),
    (4.2) at least one organosilicon compound which includes at least one epoxy radical, and
    (4.3) from 0.38 to 2.0% by weight based on the total weight of the coating composition of at least one metal M chelate and/or one metal alkoxide of the general formula: $M(OJ)_n$, with n equal to the valency of M and J equal to a linear or branched $C_1$-$C_8$ alkyl, M being selected from the group consisting of: Ti, Zr, Ge, Li, Mn, Fe, Al and Mg,
  (5) at least one polyorganosiloxane resin having at least two different functional units selected from the group consisting of $R_3SiO_{0.5}$ (M functional unit), $R_2SiO$ (D functional unit), $RSiO_{1.5}$ (T functional unit), and $SiO_2$ (Q functional unit) wherein at least one of the functional units is a T or Q functional unit, in which the R radicals are the same or different and are linear or branched $C_1$-$C_6$ alkyl, $C_2$-$C_4$ alkenyl, phenyl or 3,3,3-trifluoropropyl radicals, said resin having an alkenyl group weight content of between 0.1 and 20% by weight, and (6) at least one cross-linking inhibitor;

applying a first coat on one side of a woven textile fabric with from 30 to 45 g/m² of the coating composition;

curing, at least partially, the first coat;

applying a second coat onto the at least partially cured first coat with from 90 to 105 g/m² of the coating composition, the exposed surface of the second coat now considered the inner surface of the fabric and the uncoated surface of the fabric now considered the outer surface; and curing the second coat, with the proviso that the rate of curing of said first coat is lower than that of the rate of curing of the second coat.

16. The barrier fabric of claim 15 which has a second fabric overlayed on the inner surface of the coated fabric.

17. The barrier fabric produced by the process of claim 4.

18. The barrier fabric produced by the process of claim 6.

19. The barrier fabric produced by the process of claim 8.

20. The barrier fabric produced by the process of claim 12.

21. The barrier fabric of claim 20 wherein a second fabric is overlayed on the inner surface of the coated fabric.

22. A barrier fabric produced by a process comprising the steps of preparing a coating composition consisting essentially of (1) a mixture of 40 weight % MDViQ resin and 60 weight % vinyl terminated polydimethylsiloxane oil having a viscosity of 60,000 cps and an average mean molecular weight of 90,000, (2) a polyhydrogenoorganosiloxane oil crosslinker containing hydrogen atoms linked to a silicon atom at the ends of the chain and on the chain at regular intervals having a viscosity of 25 cps and an average mean molecular weight of 2,500 and 0.7% by weight of hydrogen atom, (3) a catalytically effective amount of chloroplatinic acid, (4) an adhesion promoter consisting essentially of:
3-trimethoxysilylpropylmethacrylate silane (MEMO),
3-glycidoxypropyltrimethoxysilane (GLYMO), and
from 0.38 to 2.0% by weight based on the total weight of the coating composition of butyl titanate, (5) a vinyl terminated polydimethylsiloxane oil having a viscosity of 100,000 cps with an average mean molecular weight of 110,000 g/mol, and (6) 1-ethynyl-1-cyclohexanol;

applying a first coat on one side of a woven textile fabric with from 10-45 g/m² of the coating composition;

curing, at least partially, the first coat;

applying a second coat onto the at least partially cured first coat with from 20-105 g/m² of the coating composition, the exposed surface of the second coat now considered the inner surface of the fabric and the uncoated surface of the fabric now considered the outer surface; and curing the second coat, with the proviso that the rate of curing of said first coat is lower than that of the rate of curing of the second coat.

23. The barrier fabric produced by the process of claim 22 wherein the fabric has:

a second fabric overlayed onto the inner surface of the coated barrier fabric.

* * * * *